United States Patent Office 3,542,782
Patented Nov. 24, 1970

3,542,782
5,6-DIHYDRO-8H-ISOQUINO[1,2-b]QUINAZOLINES
William J. Houlihan and Robert E. Manning, Mountain Lakes, N.J., assignors to Sandoz-Wander, Inc., Hanover, N.J.
No Drawing. Original application Mar. 15, 1967, Ser. No. 623,238, now Patent No. 3,497,499, dated Feb. 24, 1970. Divided and this application Nov. 17, 1969, Ser. No. 877,434
Int. Cl. C07d 51/48
U.S. Cl. 260—251                    2 Claims

ABSTRACT OF THE DISCLOSURE

Compounds from the group consisting of dihydro- and octahydro-8H-isoquino[1,2-b]quinazolines. The compounds are useful as central nervous system depressants, antipyretic agents and antiinflammatory agents.

---

This application is a division application of Ser. No. 623,238 filed Mar. 15, 1967 now Patent No. 3,497,499, issued Feb. 24, 1970.

This invention relates to the compounds of the formula:

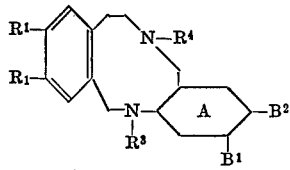

(I)

wherein $R^1$, $R^2$, $R^3$, $R^4$, $B^1$ and $B^2$ and ring A are as defined below, intermediates, pharmaceutically acceptable acid addition salts and quaternary ammonium salts thereof.

Intermediates of compounds I include compounds of the formulae:

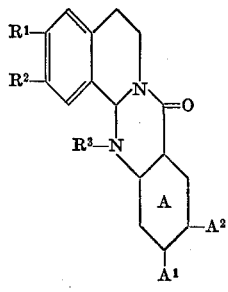

(II)

wherein $R^1$, $R^2$, $R^3$, $A^1$, $A^2$ and ring A are as defined below;

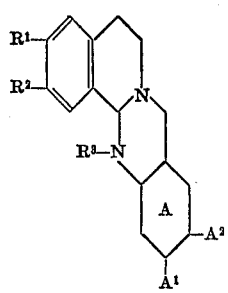

(III)

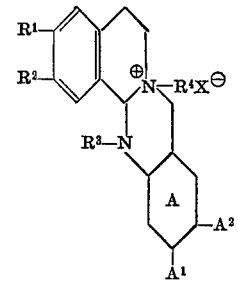

(IV)

wherein $R^1$, $R^2$, $R^3$, Ring A, $A^1$ and $A^2$ are as defined below, and wherein:

Ring A is a member selected from the group consisting of ortho-phenylene and orthocyclohexylene;

$R^1$ is a member selected from the group consisting of a hydrogen atom, linear alkyl having from 1 to 4 carbon atoms, e.g. methyl, ethyl, propyl and butyl, linear alkoxy having from 1 to 4 carbon atoms, e.g. methoxy, ethoxy, propoxy and butoxy and, taken together with $R^2$, methylenedioxy (—O—CH$_2$—O—);

$R^2$ is a member selected from the group consisting of a hydrogen atom, linear alkyl having from 1 to 4 carbon atoms, linear alkoxy having from 1 to 4 carbon atoms and, taken together with $R^1$, methylenedioxy;

$R^3$ is a mmeber selected from the group consisting of a hydrogen atom and methyl;

$R^4$ is a linear alkyl having from 1 to 4 carbon atoms;

$A^1$ is a member selected from the group consisting of a hydrogen atom, fluoro, chloro, linear alkyl having from 1 to 4 carbon atoms, linear alkoxy having from 1 to 4 carbon atoms and, taken together with $A^2$, methylenedioxy;

$A^2$ is a member selected from the group consisting of a hydrogen atom, fluoro, chloro, linear alkyl having from 1 to 4 carbon atoms, linear alkoxy having from 1 to 4 carbon atoms and, taken together with $A^1$, methylenedioxy;

$B^1$ is a member selected from the group consisting of a hydrogen atom, linear alkyl having from 1 to 4 carbon atoms, linear alkoxy having from 1 to 4 carbon atoms and, taken together with $B^2$, methylenedioxy;

$B^2$ is a member selected from the group consisting of a hydrogen atom, linear alkyl having from 1 to 4 carbon atoms, linear alkoxy having from 1 to 4 carbon atoms and, taken together with $B^1$, methylenedioxy; and X is a member selected from the group consisting of chloro, bromo and iodo, provided that each of $A^1$, $A^2$, $B^1$ and $B^2$ is a hydrogen atom where ring A is orthocyclohexylene.

Compounds I include the classes of compounds Ia; Ib; Ic and Id:

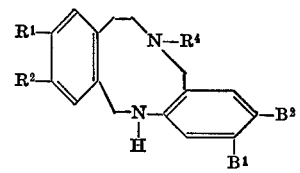

(Ia)

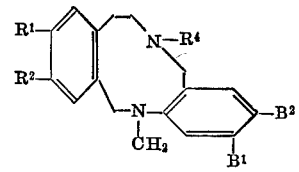

(Ib)

and

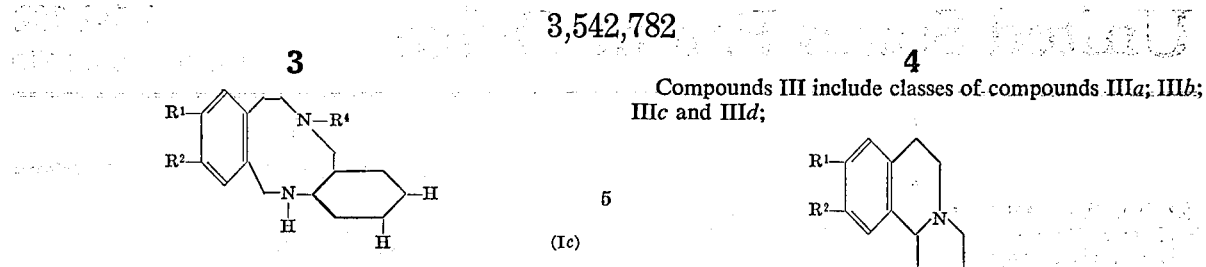
and
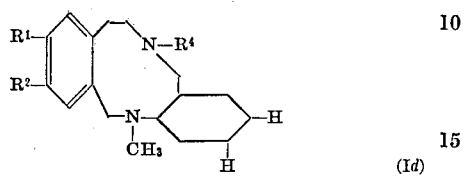
wherein $R^1$, $R^2$, $R^4$, $B^1$ and $B^2$ are as defined above.
Compounds II includes classes of compounds IIa; IIb; IIc and IId:
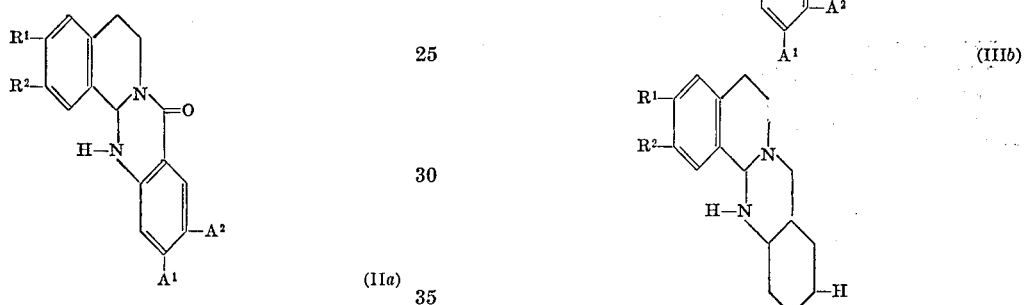
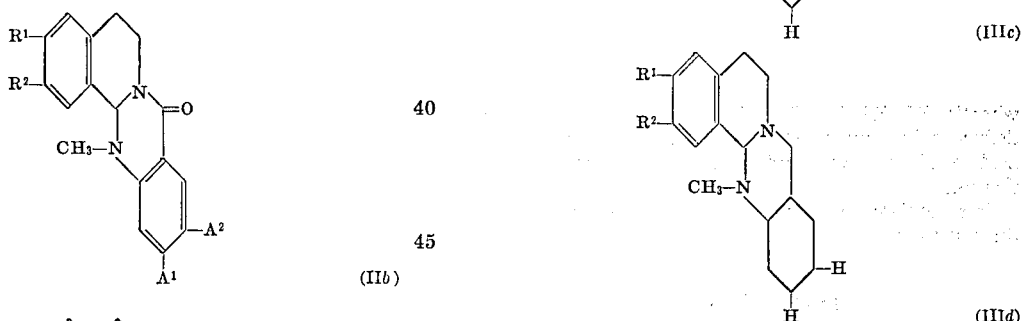
wherein $R^1$, $R^2$, $A^1$ and $A^2$ are as defined above.
Compounds III include classes of compounds IIIa; IIIb; IIIc and IIId;
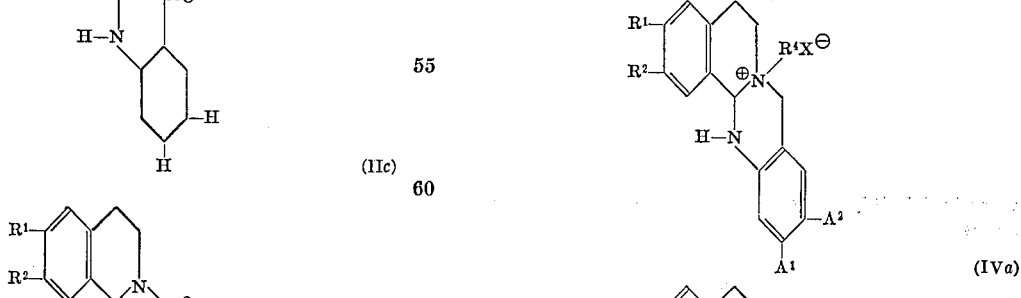
wherein $R^1$, $R^2$, $A^1$ and $A^2$ are as defined above.
Compounds IV include classes of compounds IVa; IVb; IVc and IVd:
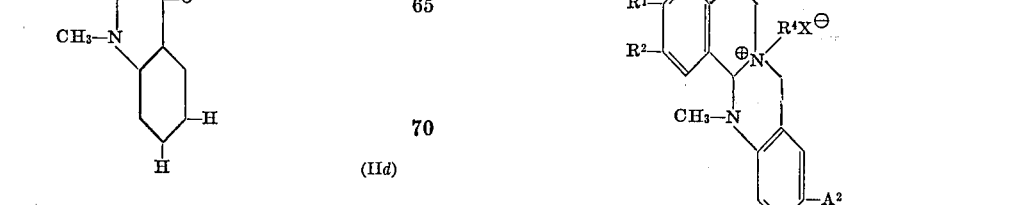

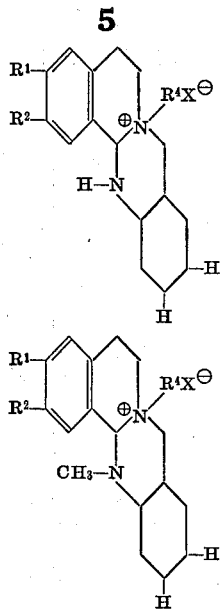

wherein $R^1$, $R^2$, $R^4$, $A^1$, $A^2$ and X are as defined above.

Compounds I may be obtained by the following reaction scheme ($R^1$, $R^2$, $R^3$, $R^4$, $A^1$, $A^2$, X and Ring A being as defined above):

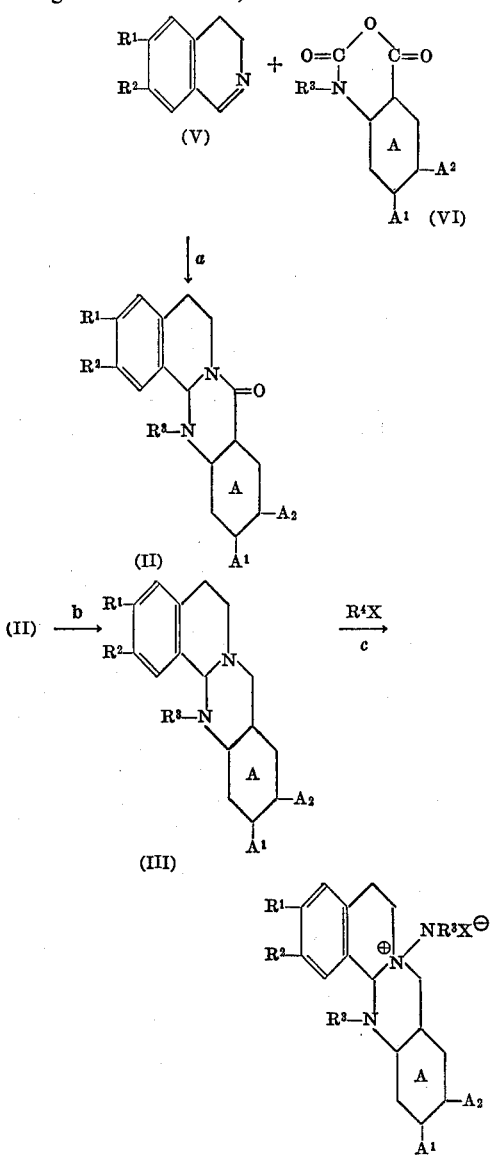

According to the reaction scheme, step a is a condensation of a dihydroisoquinoline (V) with an isatoic anhydride (VI), e.g. by admixing and heating compounds V and VI, to form a compound II (a isoquino[1,2-b]quinazolin-8-one.)

Step b is a reduction of the compound II to the corresponding compound III, e.g. by heating with lithium aluminum hydride (LAH) in a suitable solvent, e.g. diethyl ether (ether).

Step c is a conversion of the compound III to a compound IV, i.e. its corresponding quaternary ammonium salt, by treatment with $R^4X$, i.e. a lower alkyl halide, e.g. $CH_3I$ in ether.

In step d the compound IV is reduced with sodium in liquid ammonia to the corresponding compound I. It is noted that where $A^1$ or $A^2$ of the compound IV is a hydrogen atom, alkyl, alkoxy or a methylenedioxy then upon reduction, the $B^1$ and $B^2$ substituents of the resulting compound I, correspond to $A^1$ and $A^2$ of compound IV. However, if any of $A^1$ and $A^2$ of compound IV is halo, i.e. fluoro or chloro, then such halo is converted to a hydrogen in step d. Hence, where any of $A^1$ and $A^2$ is halo, then the corresponding $B^1$ or $B^2$ of the resulting compound I, will be a hydrogen. It is preferred to use compounds IV wherein $A^1$ and $A^2$ correspond to the desired $B^1$ and $B^2$ substituents of the compound I.

Since step a of the reaction scheme is an idealized illustration, it shows the preparation of compounds II. However, it has been found that in carrying out step a that where $R^3$ is a hydrogen atom, compounds VII, are also formed, i.e. compounds of the formula

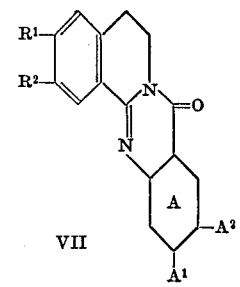

VII wherein $R^1$, $R^2$, $A^1$, $A^2$ and ring A are as defined above.

Subjection of a compound IIIa or IIIc to a hydrogen atmosphere, e.g. 20 to 100 p.s.i., in the presence of $PtO_2$, preferably in a solvent, e.g. ethanol, with agitation, results in the preparation of a compound VIII, i.e. a compound of the formula:

(VIII)

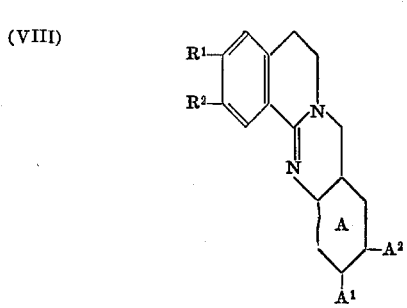

wherein $R^1$, $R^2$, $A^1$, $A^2$ and Ring A are as defined above.

Compounds IIa, IIb, IIc and IId may be prepared according to the reaction scheme by using as compound VI an isatoic anhydride, an N-methyl isatoic anhydride, hexahydroisatoic anhydride and N-methyl hexahydroisatoic anhydride, respectively.

Compounds IIa and IIb can be converted to compounds IIc and IId, respectively, by hydrogenation well-known methods. Where any of A¹ or A² of compounds IIa or IIb is halo then such halo is converted to a hydrogen atom during the hydrogenation. Example 9, presented hereinafter, illustrates such a conversion.

Compounds I, II, III VII and VIII are active upon the central nervous system. Compounds I are useful as central nervous system stimulants and also hypotensive agents. They may be administered to mammals either orally or parenterally in daily doses of from 1 to 10 mg./kg. of body weight, e.g., from 50 to 600 mg. per diem, preferably administered in divided doses from 2 to 4 times a day.

Compounds II, III, VII and VIII are useful as central nervous system depressants, anti-inflammatories and antipyretics. They are administered to mammals either orally or parenterally in daily doses of from 5 to 30 mg./kg. of body weight, e.g., from 300 to 1800 milligrams per diem, preferably administered in divided doses 2 to 4 times a day.

Pharmaceutically acceptable acid addition and quaternary ammonium salts of compounds I, III and VIII are equally as effective as compounds I, III and VIII, respectively and may be used in a similar manner. The acid addition and quarternary ammonium salts may be prepared according to well-known procedures from compounds, I, III and VIII, respectively. They are all useful, in accord with recognized procedures, for the preparation of corresponding pharmaceutically acceptable salts.

Among the pharmaceutically acceptable acid addition salts are salts of organic acids, e.g. tartaric acid; inorganic acids, e.g. hydrochloric acid, hydrobromic acid and sulfuric acid; monobasic acids, e.g. an alkysulfonic acid, such as methylsulfonic acid ($H_3C-SO_3H$); dibasic acids, e.g. succinic acid; tribasic acids, e.g. phosphoric acid and citric acid; saturated acids, e.g., acetic acid; ethylenically unsaturated acids, e.g. maleic acid and fumaric acid and aromatic acids, e.g. salicylic acid and arylsulfonic acids, such as phenylsulfonic acid. The only limitation on the acid is that the resulting salt be pharmaceutically acceptable; it is preferred, however, that the acid addition salt be water-soluble.

Each of the pharmaceutically active compounds of this invention may be, e.g. incorporated, for oral administration, in a tablet as the sole active ingredient. A typical tablet is constituted by from 1 to 3 percent binder, e.g. tragacanth from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compounds is:

| | Parts |
|---|---|
| Title compound of Example 4 | 50 |
| Tragacanth | 2 |
| Lactose | 39.5 |
| Corn starch | 5 |
| Talcum | 3 |
| Magnesium stearate | 0.5 |
| Alcohol SD-30, q.s. | |
| Purified water, q.s. | |

Examples illustrative of this invention follow. In the example all temperatures are in degrees centigrade and all percents and parts are by weight, unless specified otherwise. Parts by weight are related to parts by volume as a kilogram is related to a liter.

EXAMPLE 1

2,3-dimethoxy-5,6,13,13a-tetrahydro-8H-isoquino[1,2-b]quinazolin-8-one

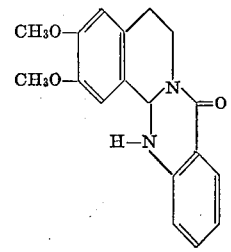

This example illustrates the preparation of a compound II according to step *a* of the reaction scheme presented above. The title compound is useful as a starting material for preparing compounds III, IV and I as is illustrated in Examples 2, 3 and 4, respectively.

Heat under reflux a mixture of 6 parts of 6,7-dimethoxy-3,4-dihydroisoquinoline and 5.1 parts of isatoic anhydride in 60 parts by volume of toluene under nitrogen for 16 hours. Cool the mixture, collect the resultant crystalline precipitate and recrystallize from methanol to obtain the title compound, M.P. 164 to 168° C.

Replacing the 6,7-dimethoxy-3,4-dihydroisoquinoline with 6,7-methylenedioxy-3,4-dihydroisoquinoline results, in a similar manner, of the corresponding compound II.

EXAMPLE 2

2,3-dimethoxy-5,6-13,13a-tetrahydro-8H-isoquino[1,2-b]quinazoline

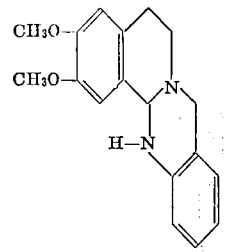

This example illustrates the preparation of a compound III which is useful in preparing compounds IV, as is illustrated in Example 3.

Add 45 parts of 2,3-dimethoxy-5,6,13,13a-tetrahydro-8H-isoquino[1,2-b]quinazolin-8-one suspended in 1500 parts by volume of tetrahydrofuran (THF) to a solution of 14 parts of lithium aluminum hydride (LAH) in 1300 parts by volume of ether and heat under reflux for 40 hours. Cool the reaction mixture, wash with 125 parts by volume of water and filter. Evaporate the filtrate under vacuum to obtain a residue which is then crystallized from ether to obtain the title compounds, M.P. 170 to 172.

Replace the 2,3-dimethoxy-5,6,13,13a-tetrahydro-8H-isoquino[1,2-b]quinazolin-8-one with 5,6,8a,9,10,11,12,12a,13,13a - decahydroisoquino[1,2-b]quinazolin - 8 - one results in the preparation, in a similar manner, of the corresponding compound III.

EXAMPLE 3

2,3-dimethoxy-5,6-13,13a-tetrahydro-8H-isoquino[1,2-b]quinazoline methiodide

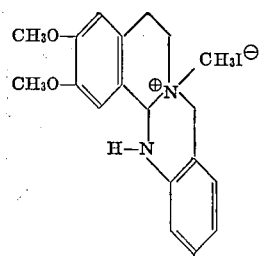

This example illustrates the preparation of the title compound which is a compound IV which is useful for preparing a compound I as is illustrated in Example 4.

Prepare a solution of 1 part of 2,3-dimethoxy-5,6,13,13a-tetrahydro-8H-isoquino[1,2-b]quinazoline in 7 parts by volume of CH$_2$Cl$_2$, 3 parts by volume of ether and 3 parts by volume of methyl iodide and allow the solution to stand at room temperature (20° C.) for ½ hour. Evaporate the solution to dryness under vacuum and recrystallize the residue from ethanol to obtain the title compound, M.P. 245 to 250° C.

Replacing the methyl iodide with ethyl bromide results in the preparation, in a similar manner, of the corresponding compound IV.

EXAMPLE 4

8,9-dimethoxy-13-methyl-5,6,11,12,13,14-hexahydro-dibenzo[b,h][1,5]diazecine

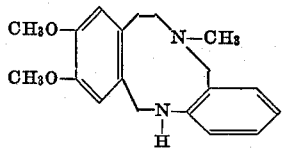

This example illustrates the preparation of a compound I.

Add one part of sodium to a stirred suspension of 4 parts of 2,3-dimethoxy-5,6,13,13a-tetrahydro-8H-isoquino[1,2-b]quinazoline methiodide in 100 parts by volume of liquid ammonia cooled in a solid carbon dioxide-acetone bath. Stir for one hour then allow the mixture to evaporate for 16 hours. Add water to the residue and extract with chloroform. Dry the chloroform extracts over sodium sulfate and evaporate under vacuum. Crystallize the residue from ether to obtain the title compound, M.P. 127° to 128° C.

Replacing the 2,3-dimethoxy-5,6,13,13a-tetrahydro-8H-isoquino[1,2-b]quinazoline methiodide with 2,3-dibutyl-5,6,13,13a - tetrahydro - 8H - isoquino[1,2-b]quinazoline methiodide results in the preparation, in a similar manner, of the corresponding compound I.

EXAMPLE 5

10-chloro-2,3-dimethoxy-13-methyl-5,6,13,13a-tetrahydro-8H-isoquino[1,2-b]quinolin-8-one

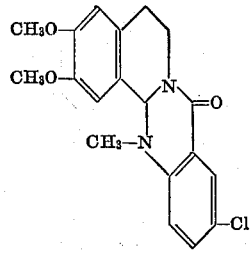

This example illustrates the preparation of a compound II, which is useful in preparing a compound III, as is illustrated in Example 6.

Heat under reflux a mixture of 50 parts of 6,7-dimethoxy-3,4-dihydroisoquinoline and 55 parts of 6-chloro-N-methyl isotoic anhydride in 500 parts by volume of ether for 16 hours. Treat the mixture with carbon black and filter. Evaporate the filtrate under vacuum and crystallize the residue from methanol. Recrystallize the product from methylene chloride-methanol to obtain the title compound, M.P. 167° to 170° C.

Replacing the 6,7-methoxy-3,4-dihydroisoquinoline with 6,7-diethoxy-3,4-dihydroxyisoquinoline results in the preparation, in a similar manner, of the corresponding compound II.

EXAMPLE 6

10-chloro-2,3-dimethoxy-13-methyl-5,6,13,13a-tetrahydro-8H-isoquino[1,2-b]quinazoline

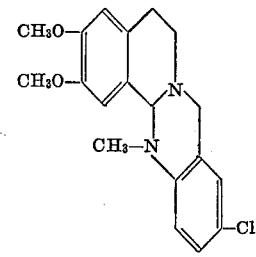

Add 30 parts of 10-chloro-2,3-dimethoxy-13-methyl-5,6,13,13a - tetrahydro - 8H - isoquino[1,2-b]quinazolin-8-one in 1500 parts by volume of ether to a refluxing solution of 9 parts of LAH in 1500 parts by volume of ether. Reflux the mixture for 18 hours. Cool the mixture and add 70 parts by volume of water. Filter the mixture and evaporate the filtrate under vacuum. Crystallize the residue from ether to obtain the title compound, M.P. 138 to 140° C.

Replacing the 10-chloro-2,3-dimethoxy-13-methyl-5,6,13,13a-tetrahydro - 8H - isoquino[1,2-b]quinazolin-8-one with 10,11-difluoro - 2,3 - dimethyl-13-methyl-5,6,13,13a-tetrahydro-8H-isoquino[1,2-b]quinazolin-8-one results in the preparation, in a similar manner, of the corresponding compound III.

EXAMPLE 7

10-chloro-13-methyl-5,6,13,13a-tetrahydro-8H-isoquino[1,2-b]quinazolin-8-one

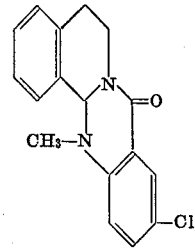

This example also illustrates the preparation of a compound II.

Reflux 29.5 parts of 3,4-dihydroisoquinoline and 32 parts of 6-chloro-N-methyl isotoic anhydride in 250 parts by volume of toluene for 18 hours. Treat the mixture with carbon black and filter. Evaporate the filtrate under vacuum and crystallize the resultant residue from ether to obtain the title compound, M.P. 130 to 132° C.

Replacing the 6-chloro-N-methyl-isotoic anhydride with 5-butoxy-6-methyl-N-methyl isotoic anhydride results in the preparation, in a similar manner, of the corresponding compound II.

EXAMPLE 8

5,6,13,13a-tetrahydo-8H-isoquino[1,2-b]quinolin-8-one

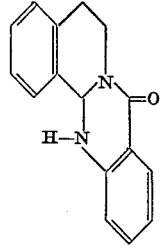

This example also illustrates the preparation of a compound II.

Reflux under nitrogen for 16 hours a mixture of 19 parts of 3,4-dihydroisoquinoline and 21 parts of isotoic anhydride in 250 parts by volume of toluene. Treat the reaction mixture with carbon black and filter. Evaporate the filtrate under vacuum to obtain a residue, crystallize the residue from ether and recrystallize from benzene to obtain the title compound, M.P. 161 to 163° C.

Replacing the isotoic acid with 5,6-dipropylisotoic anhydride results in the preparation, in a siimlar manner, of the corresponding compound II.

EXAMPLE 9

2,3-dimethyl-13-methyl-5,6,8a,9,10,11,12,12a,13,13a-decahydro-8H-isoquino[1,2-b]qninazolin-8-one

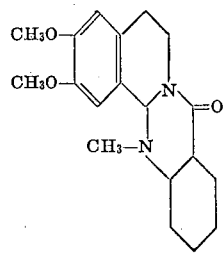

This example illustrates the preparation of a compound IId from a compound IIb.

Shake a solution of 18 parts of 10-chloro-2,3-dimethoxy-13 - methyl - 5,6,13,13a - tetrahydro - 8H - isoquino[1,2-b]quinazolin-8-one in 150 parts by volume of glacial acetic acid containing 0.5 part of $PtO_2$ in an atmosphere of hydrogen (at 50 p.s.i.) for 20 hours. Filter the reaction mixture through "Celite" (diatomaceous earth) and evaporate the filtrate under vacuum. Mix the residue with sodium carbonate solution and methylene chloride, recover the methylene chloride layer and dry over sodium sulfate, then evaporate to obtain a residue. Crystallize the residue from ether to obtain the title compound, M.P. 146 to 148° C.

Replacing the 10-chloro-2,3-dimethoxy-13-methyl-5,6, 13,13a - tetrahydro - 8H - isoquino[1,2 - b]quinazolin-8-dro-8H-isoquino[1,2-b]quinazolin-8-one with 2-propoxy-13 - methyl - 5,6,13,13a - tetrahydro-8H-isoquino[1,2-a] quinazolin-8-one results in the preparation, in a similar manner, of the correspoding compound IId.

EXAMPLE 10

10-chloro-2,3-dimethoxy-5,6-dihydro-8H-isoquino[1,2-b] quinazolin-8-one

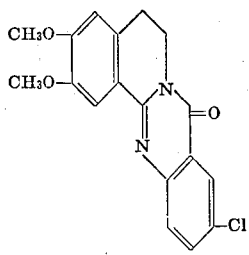

This example illustrates the preparation of a compound VII.

Heat under reflux for 16 hours a mixture of 19 parts of 6,7 - dimethoxy - 3,4 - dihydroisoquinoline and 17.5 parts of 6-chloro isotoic anhydride in 200 parts by volume of toluene. Treat the reaction mixture with carbon black and filter. Evaporate the filtrate under vacuum to a thick paste and triturate with 20 parts by volume of methanol and 100 parts by volume ether and filter to obtain the title compound, M.P. 255 to 257° C.

Replacing the 6,7 - dimethoxy-3,4-dihydroisoquinoline with 6,7-dimethyl-3,4-dihydroisoquinoline results in the preparation, in a similar manner, of the corresponding compound VII.

EXAMPLE 11

2,3-dimethoxy-5,6-dihydro-8H-isoquino[1,2-b]quinazoline

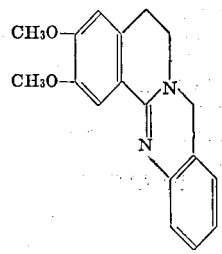

This example illustrates the preparation of a compound VIII.

Shake a solution of 1 part of 2,3-dimethoxy-5,6,13,13a-tetrahydro-8H-isoquino[1,2-b]quinazoline in 100 parts by volume of ethanol, containing 0.2 part of $PtO_2$ in an atmosphere of hydrogen (50 p.s.i.) for 3 hours. Filter the reaction mixture through "Celite" and evaporate the filtrate under vacuum. Crystallize the residue twice from methanol to obtain the title compound, M.P. 156 to 159° C.

Replacing the 2,3-dimethoxy-5,6,13,13a-tetrahydro-8H-isoquino[1,2-b]quinazoline with 2-propoxy-5,6,13,13a-tetrahydro-8H-isoquino[1,2-b]quinazoline results in the preparation, in a similar manner, of the corresponding compound VIII.

What is claimed is:

1. A member selected from the group consisting of the free base, a pharmaceutically acceptable acid addition salt thereof and a pharmaceutically acceptable quaternary ammonium salt thereof; the free base being of the formula:

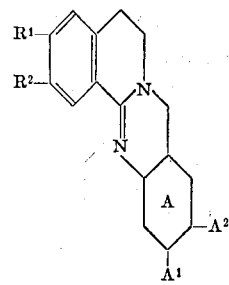

wherein:

Ring A is a member selected from the group consisting of ortho-phenylene and ortho-cyclohexylene $R^1$ is a member selected from the group consisting of a hydrogen atom, linear alkyl having from 1 to 4 carbon atoms, linear alkoxy having from 1 to 4 carbon atoms and, taken together with $R^2$, methylenedioxy (—O—$CH_2$—O—)

$R^2$ is a member selected from the group consisting of a hydrogen atom, linear alkyl having from 1 to 4 carbon atoms, linear alkoxy having from 1 to 4 carbon atoms and, taken together with $R^1$, methylenedioxy;

$A^1$ is a member selected from the group consisting of a hydrogen atom, fluoro, chloro, linear alkyl having from 1 to 4 carbon atoms, linear alkoxy having from 1 to 4 carbon atoms and, taken together with A², methylenedioxy;

A² is a member selected from the group consisting of a hydrogen atom, fluoro, chloro, linear alkyl having from 1 to 4 carbon atoms, linear alkoxy having from 1 to 4 carbon atoms and, taken together with A¹, methylenedioxy; provided that each of A¹, A² is a hydrogen atom where Ring A is orthocyclohexylene.

2. A compound according to claim 1 which is 2,3-dimethoxy-5,6-dihydro-8H-isoquino[1,2-b]quinazoline.

References Cited

UNITED STATES PATENTS 3,297,696  1/1967  Ott _____ 260—247.5

ALEX MAZEL, Primary Examiner
R. V. RUSH, Assistant Examiner

U.S. Cl. X.R.
424—251